Dec. 16, 1930.  W. J. LEWIN  1,785,452
ATTACHMENT FOR TRACTION WHEELS
Filed June 8, 1928
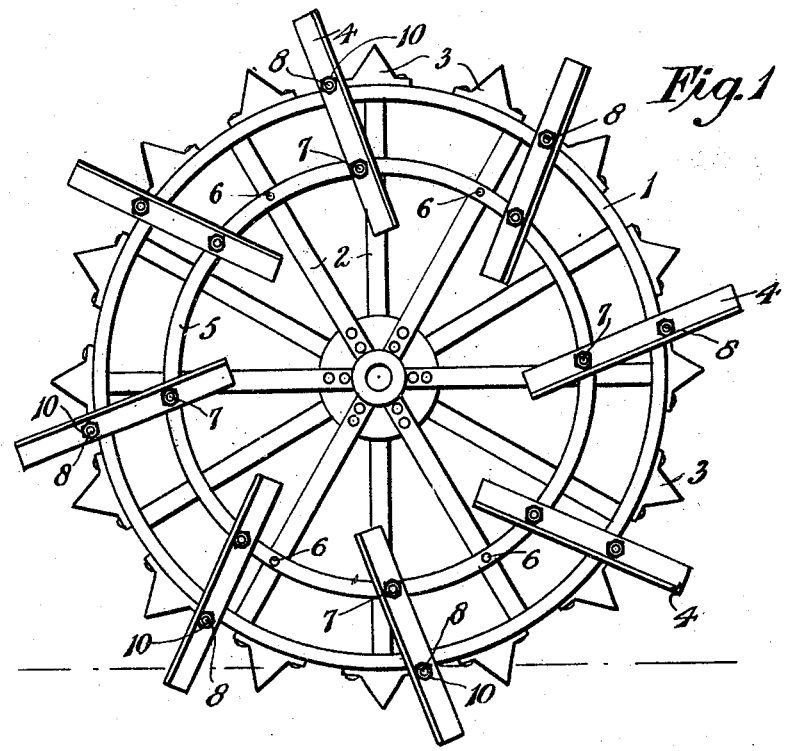
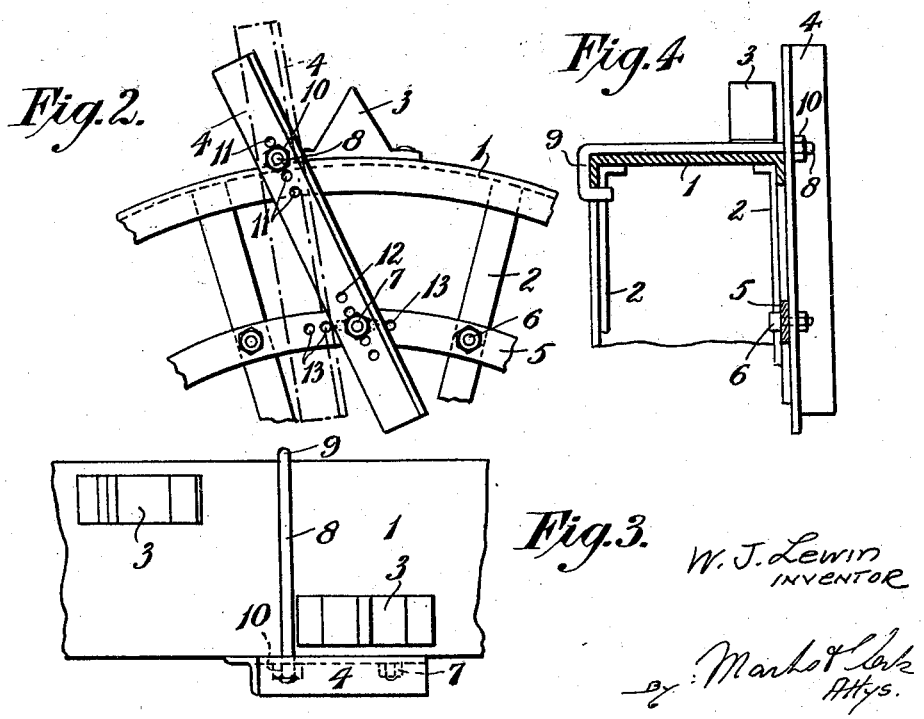
W. J. Lewin
INVENTOR Patented Dec. 16, 1930

1,785,452

UNITED STATES PATENT OFFICE

WALTER JONATHAN LEWIN, OF MATHOURA, NEW SOUTH WALES, AUSTRALIA

ATTACHMENT FOR TRACTION WHEELS

Application filed June 8, 1928, Serial No. 283,926, and in Australia March 1, 1928.

This invention, which relates to improved attachments to one or both sides of the traction wheels of tractors, farm implements, and the like, consists of improved gripping members, which are applicable primarily to the traction wheels of farm tractors or farm implements, but are equally applicable to the bull traction wheels of harvesting machines, and also to other traction wheels having metal rims or solid rubber tyres.

It is customary, at present, when tractors are required to travel over soft ground, to attach to the tread surface of the wheel rims of said traction wheels, a series of spuds, to enable such wheels to obtain a firm hold on the ground over which they are travelling. In practice, however, it is found that these spuds, on the tread surface of the wheel rims, are not satisfactory when the wheels are travelling over adhesive ground, as those portions of the wheel rims between the spuds soon become clogged or packed with soil to such an extent as to render said spuds inoperative until the accumulated soil is removed. With a view of overcoming this drawback, I provide improved attachments consisting of gripping members preferably of angle section metal, attached to one or both sides of the traction wheels, so that each device will extend radially a required distance beyond the wheel rim, and said spuds, in such a manner that each gripping member will readily enter and grip the soil as the wheels revolve, wheel slip being obviated by reason of the fact that no clogging of soil can take place between said gripping members.

My attachments may be readily applied to traction wheels having spuds secured to the tread surface of the wheels, so as to operate in conjunction with said spuds, when the vehicle is travelling over adhesive soil.

The invention will now be more fully described, aided by reference to the accompanying sheet of drawings, wherein:—

Fig. 1 is a view in side elevation of a tractor wheel with the ordinary spuds secured to the tread surface of the rim, and having my improved gripping members attached to the side of said wheel, to operate in conjunction with the said spuds so as to eliminate wheel slip;

Fig. 2 is a detail view (on an enlarged scale) of a portion of a tractor wheel fitted with my improved angle iron gripping members secured to the side of the same, and means for adjusting the position of said gripping members as and when required;

Fig. 3 is a view in plan, and Fig. 4 a view in sectional elevation of Fig. 1.

In the drawings, 1 is the rim and 2 the spokes of a well-known type of tractor wheel fitted with the ordinary cast metal spuds 3, secured to the tread surface of the wheel rim in staggered arrangement.

According to my invention, a series of angle iron gripping members 4 are detachably secured to the side of each traction wheel and in required spaced relationship, so that each grip member will extend a required distance beyond the tread surface of the wheel rim 1, and the spuds thereon, as shown in the drawings.

The angle iron gripping members 4, above referred to, are preferably secured to the side of the wheel at an angle as shown. For this purpose, a metal ring 5 is provided which may bear against the wheel spokes or be secured thereto by bolts 6 to the outer surface of the wheel spokes 2, to enable the inner ends of the gripping members 4 to be secured to said ring by bolts 7. The outer end portion of each gripping member 4 bears against the side of the wheel rim and is firmly held in position by a transverse bolt 8 which rests upon the tread surface of the wheel rim and is furnished at its free end with a hook 9 adapted to engage the opposite edge or flange of the wheel rim (see Fig. 4) while the screw-threaded end of said bolt passes through the abutment flange of the gripping member 4 and is fitted with a securing nut 10.

By this arrangement of fastening, the whole of the gripping members 4 can be readily and expeditiously fitted to or removed from the side of the wheel as and when required.

As seen in Figs. 1 and 2 the gripping members 4 are arranged at a suitable angle in order that their projecting ends will readily enter the soil as the wheel revolves and so prevent slippage.

As shown in Fig. 2 each gripping member 4 is secured to the side of the wheel in such a manner as to enable the length of its extending or overhanging portion to be adjusted, and also, if required, to alter or adjust the angle of said gripping member.

For these purposes, each gripping member 4 is furnished with a series of adjustment holes 11 at its outer end to receive the screwed end of the hooked transverse bolt 8, while a series of adjustment holes 12 are formed in the inner end of each gripping member, to enable the bolt 7 to be passed through a selected hole 12 and through one of a series of adjustment holes 13 formed in the metal ring 5.

It will be understood that, although the gripping members 4 are shown attached to one side of the wheel only, they may, if desired, be attached to both sides of said wheel in the manner hereinbefore described, or, in the case of a multiple rimmed wheel, a series of gripping members may be provided on each side of each rim.

I claim:—

1. An attachment for a traction wheel consisting of a metal ring detachably secured to one side of the wheel, a series of gripping members arranged against the ring and the rim of the wheel and projecting beyond the rim of the wheel, means engaged in various positions of adjustment of the gripping members and detachably engaged with the remote side of the wheel for adjustably connecting each of the gripping members in position and at the same time permitting of a pivotal movement of each of said members, and means detachably engaged with the inner portions of the members and the ring for holding the members in various positions of adjustment.

2. An attachment for a traction wheel consisting of a metal ring detachably secured to one side of a wheel and provided between the spokes of the wheel with separate series of openings, a series of gripping members each provided near the respective end portions with separate series of openings, hook bolts engaged with the remote side of the wheel rim and through one of the openings in the outer portions of the gripping members, and devices passing through desired and aligning openings in the inner portions of the members and in the ring for fastening the members in the desired position of angular and radial adjustment.

WALTER JONATHAN LEWIN.